United States Patent [19]

Pollard

[11] 4,260,576
[45] Apr. 7, 1981

[54] THERMAL EXPANSION COMPENSATION APPARATUS AND METHOD FOR MAKING COMPOSITE SKIS

[75] Inventor: Jerry Pollard, Woodinville, Wash.

[73] Assignee: The Coleman Company, Inc., Wichita, Kans.

[21] Appl. No.: 156,555

[22] Filed: Jun. 5, 1980

[51] Int. Cl.³ .................. B29C 1/00; B29C 27/22; B29C 27/30
[52] U.S. Cl. .................. 264/257; 156/228; 156/245; 156/330; 249/93; 249/95; 249/160; 264/259; 264/261; 264/275; 264/279; 280/610; 425/501; 425/508; 425/110; 425/112; 425/125; 425/127; 425/446
[58] Field of Search .............. 264/137, 231, 259, 257, 264/261, 263, 275, 277, 278, 279, 299, 321; 425/110, 111, 125, 112, 127, 406, 446, 501, 508; 156/228, 330, 245; 280/610; 249/91, 93, 94, 95, 96, 160

[56] References Cited

U.S. PATENT DOCUMENTS

| 2,184,791 | 12/1939 | Broome | 156/228 |
| 3,542,388 | 11/1970 | Veneko | 156/245 |
| 3,879,245 | 4/1975 | Fetherstone et al. | 264/321 |
| 4,035,000 | 7/1977 | Lacroix | 280/610 |

FOREIGN PATENT DOCUMENTS

| 254748 | 6/1967 | Austria | 280/610 |
| 1220770 | 7/1966 | Fed. Rep. of Germany | 264/137 |
| 51-16070 | 5/1976 | Japan | 264/137 |

Primary Examiner—W. E. Hoag

[57] ABSTRACT

A composite ski is made by bonding a metal ski top to a molded ski body during the molding and curing of the body. The ski body is placed in the mold cavity of a two-part mold, and the metal top is movably supported on the other mold part. One end of the metal top is held by a spring-biased holding pin which permits the metal top to expand and contract relative to the mold part as the mold is heated and cooled while maintaining the metal top in alignment with the cavity.

10 Claims, 10 Drawing Figures

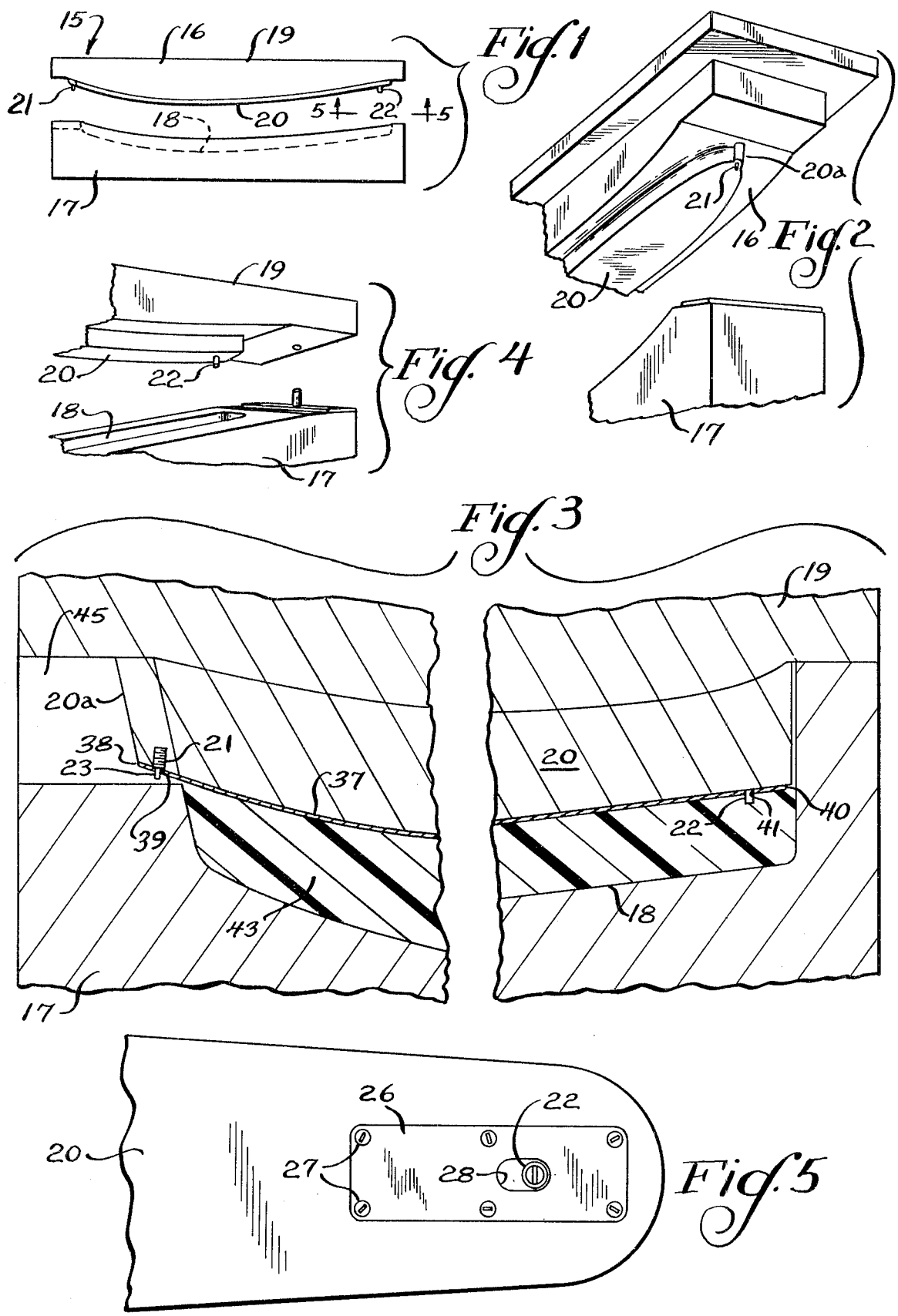

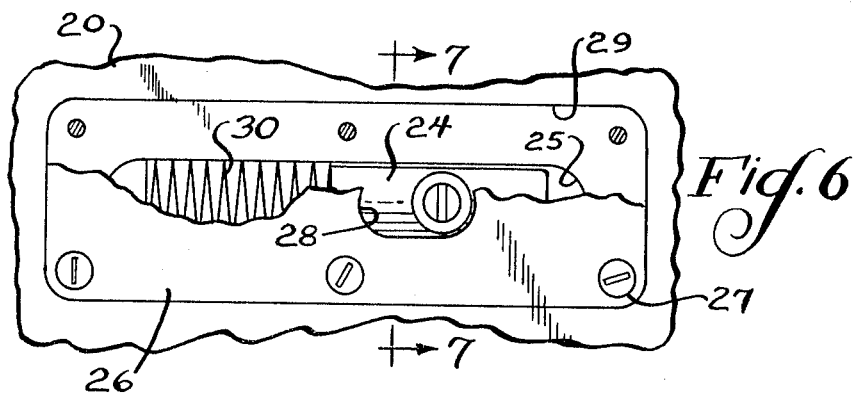
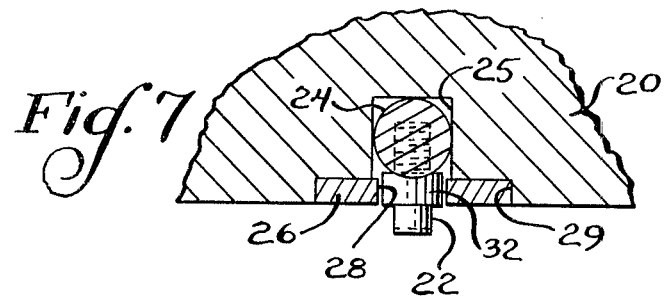
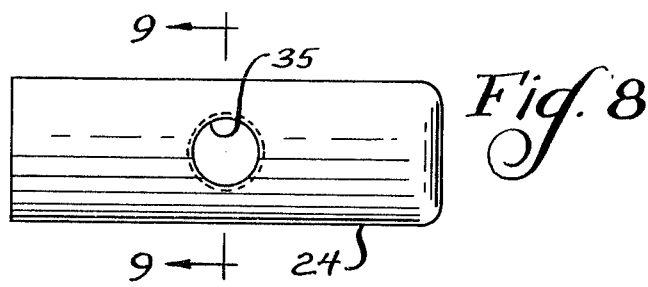
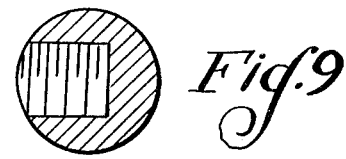
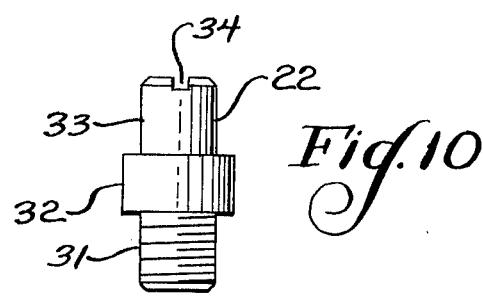

THERMAL EXPANSION COMPENSATION APPARATUS AND METHOD FOR MAKING COMPOSITE SKIS

BACKGROUND

This invention relates to a method of making a composite ski which includes a molded ski body and a metal top. The invention finds particular utility in making water skis, and the invention will be explained in conjunction with the manufacture of water skis. However, it will be understood that the invention can also be used for making snow skis.

Composite water skis are conventionally made by wrapping fiberglass around a foam core, saturating the fiberglass with epoxy resin, and inserting the raw ski body into a mold. The mold is then closed and applies pressure and heat to cure the ski body. After a period of time, the ski body is removed from the mold and de-flashed, and the top surface is sanded. Adhesive is applied to the top surface, and a metal ski top is aligned with the ski body and bonded thereto by the adhesive.

If the metal top could be bonded directly to the ski body during the molding cycle, the steps of sanding the molded ski body, applying adhesive, and aligning and fitting the top to the ski body could be eliminated. However, unsatisfactory results are obtained if the metal top is fixed to the top mold part at both ends or is merely positioned over the ski body as the mold closes. Ski tops and ski bodies have different rates of thermal expansion, and the ski top also generally has a different rate of thermal expansion than the mold. As a result, the top tends to wrinkle during the curing cycle as temperatures change. It is also desirable to maintain a certain spacing from the edge of the metal top to the edge of the ski body, e.g., 0.020 inch. This spacing preserves the flash line or clearance designed into the mold for escape of resin and prevents the metal top from expanding from the heat of the mold and sealing off the flash line and/or buckling or otherwise deforming the periphery of the top against the walls of the mold cavity during the compression molding cycle.

SUMMARY OF THE INVENTION

The invention solves the foregoing problems by movably supporting the metal top on the mold with a thermal expansion compensating, spring-loaded holding pin. The movable holding pin is slidably mounted in a recess in the mold punch and projects toward the mold cavity. The movable holding pin is inserted through an opening in one end of the metal top, and a stationary holding pin on the mold punch is inserted through an opening in the other end of the metal top. The two pins maintain the alignment between the metal top and the mold as the metal top is heated by the mold and expands, and the spring-loaded holding pin permits the length of the metal top to increase as it is heated. The registry of the metal top with the sides of the mold cavity is therefore preserved during the molding and curing cycle. After the ski has been molded and cured, the mold can be opened, and the metal top will remain bonded to the ski body.

DESCRIPTION OF THE DRAWING

The invention will be explained in conjunction with an illustrative embodiment shown in the accompanying drawing, in which FIG. 1 is a side elevational view of a two-part ski mold, the upper part being provided with thermal expansion compensation holding means for a metal ski top;

FIG. 2 is a fragmentary perspective view of the front of the top mold part showing the stationary holding pin;

FIG. 3 is a fragmentary sectional view, partially broken away, of the closed mold during the ski-molding operation;

FIG. 4 is a fragmentary perspective view of the rear of the top mold showing the movable holding pin;

FIG. 5 is a fragmentary bottom plan view of the top mold part as would be seen along the line 5—5 of FIG. 1;

FIG. 6 is a fragmentary view similar to FIG. 5 with the cover plate partially broken away;

FIG. 7 is a fragmentary sectional view taken along the line 7—7 of FIG. 6;

FIG. 8 is a plan view of the shuttle which supports the movable holding pin;

FIG. 9 is an end view of the shuttle; and

FIG. 10 is an elevational view of the movable holding pin.

DESCRIPTION OF SPECIFIC EMBODIMENT

Referring first to FIG. 1, the numeral 15 designates generally a conventional two-part mold for molding water skis consisting of a top mold part 16 and a bottom mold part or cavity 17. The bottom part has an open cavity 18 which is shaped to correspond to the finished ski. The top part has a base 19 and a punch 20 having a periphery corresponding to the periphery of the cavity. The two parts are supported in the conventional manner for relative movement toward and away from each other so that the punch can be moved toward the cavity to close the cavity. Ordinarily, the cavity will be stationary, and the punch will be movably supported above the cavity for vertical movement. The side wall of the punch is spaced a selected distance away from the side wall of the cavity (e.g., 0.020 inch) to provide a flash line or clearance for the escape of resin as the mold closes.

A stationary holding pin 21 is positioned at the front end of the punch 20 (the left end as viewed in FIG. 1), and a movable holding pin 22 is movably mounted in the punch adjacent the rear end thereof. Referring to FIGS. 2 and 3, the stationary pin is threaded into a generally cylindrical front extension 20a on the punch and includes a holding portion 23 which projects downwardly beyond the bottom surface of the punch. The holding portion is desirably tapered, and in one specific embodiment, the taper formed an included angle 10°.

Referring now to FIGS. 5-7, the movable holding pin 22 is mounted on a cylindrical rod or shuttle 24 which is slidable within an elongated recess 25 formed in the rear portion of the punch 20. The recess is closed by a cover plate 26 which is attached to the punch by screws 27, and the holding pin 22 extends through an elongated slot 28 in the cover plate. The cover plate is positioned in a laterally enlarged recess 29 in the punch so that the bottom surface of the cover plate is flush with the bottom surface of the punch. The screw holes in the cover plate are countersunk so that the heads of the screws 27 are also flush with the cover plate.

A coil spring 30 is retained within the recess 25 by the cover plate and resiliently biases the shuttle 24 toward the rear end of the punch (to the right as viewed in FIG.

6). The holding pin is thereby resiliently urged against the rear end of the slot 28 in the cover plate.

The holding pin 22 includes a threaded portion 31 (FIG. 10), a radially enlarged shoulder portion 32, and a cylindrical holding portion 33. The end of the holding portion is provided with a screwdriver slot 34 to facilitate mounting the holding pin on the shuttle. The shuttle 24 is provided with a threaded opening 35 (FIGS. 8 and 9) in the middle of its length into which the threaded end of the holding portion is screwed.

As can be seen in FIG. 7, the shoulder 32 of the holding pin is positioned in the slot 28 in the cover plate, and the bottom surface of the shoulder is substantially flush with the bottom surface of the cover plate. The diameter of the shoulder is just slightly less than the width of the slot so that the holding pin is confined against lateral movement, i.e., movement toward the sides of the mold. The diameter of the shuttle 24 is just slightly less than the space between the cover plate and the top of the recess so that the shuttle can slide freely within the recess but is confined against substantial vertical movement.

The shape of the bottom surface of the punch 20 corresponds to the shape of the top surface of the finished ski, and a metal top 37 (FIG. 3) is pre-formed to substantially the same configuration. The metal top is conventionally printed with graphics, as by silkscreening, before being joined to the body of the ski. The front end 38 of the metal top is provided with an opening 39 for receiving the front holding pin 21, and the rear end 40 of the metal top is provided with an opening 41 (FIG. 3) for receiving the rear holding pin 22. The openings 39 and 41 in the metal top are preferably located on the longitudinal axis of the metal top.

The distance between the openings 39 and 41 is such that the rear holding pin must be pulled away from the rear of the slot 28 in the cover plate 26 toward the front holding pin against the bias of the spring 30. The top can be conveniently mounted on the punch by pushing the rear end of the top against the punch so that the rear holding pin is inserted through the rear hole 41 and then pulling the ski forwardly slightly against the bias of the spring until the front holding pin can be inserted into the front hole 39.

In the preferred practice of the invention an elastomeric O-ring is inserted over the rear holding pin after the top is inserted over the pin. A push nut is then fitted over the pin to capture the O-ring between the metal top and the nut. The nut is of the type which slides freely in one direction (toward the punch) but not in the other direction. The O-ring and push nut hold the top securely on the pin, and the O-ring provides a seal which prevents resin from squeezing through the opening in the metal top and entering the spring-loaded mechanism in the punch. If desired, an O-ring and push nut can be inserted over the front holding pin to hold the front of the metal top, but in the preferred embodiment the metal top was held on the front holding pin by a friction fit.

A raw ski body (FIG. 3) can be placed in the cavity of the bottom mold part either before or after the metal top is mounted on the punch. The ski body may be formed in the conventional manner by wrapping fiberglass around a foam core and saturating the fiberglass with epoxy resin.

The two parts of the mold are provided with conventional means for heating the mold, and the mold is usually heated to about 170° F. The metal top is heated by the punch and expands. The top, which is usually aluminum, normally has a higher rate of thermal expansion than the punch, and the movable rear holding pin 22 permits the length of the metal top to increase relative to the punch. the slot 28 in the cover plate 26 is sized relative to the expected amount of expansion to permit the holding pin to move to accommodate the expansion without engaging the rear end of the slot.

Although the movable holding pin permits longitudinal expansion of the metal top relative to the punch and the cavity, the holding pins remain on a line extending through the stationary front holding pin 21 and the original position of the movable rear holding pin and maintain the longitudinal axis of the metal top in its original position. The longitudinal axis of the metal top is therefore maintained in alignment or registration with the punch and the sides of the cavity as the metal top expands.

If the metal top is sized so that the periphery of the heated and expanded metal top is flush with the periphery of the punch, the holding pins will ensure that one side of the metal top will not extend into the flash line or clearance between the side wall of the punch and the side wall of the cavity. If the metal top were not maintained in longitudinal alignment with the punch, then one side of the metal top would expand into the flash line.

After the mold is heated, the punch is moved toward the cavity to close the mold. The metal top is forced against the ski body, and the ski body is compressed by the mold. The mold is maintained closed while the ski body is cured under heat and pressure in the conventional manner, and the metal top becomes bonded to the resin of the ski body.

Referring to FIG. 3, the front portion of the punch which carries the front holding pin 21 extends forwardly of the front of the cavity and is positioned in a slot or relief 45 which is machined in the bottom mold part. The front end portion of the metal top which extends beyond the front of the cavity is referred to as a "tooling tab" and is removed after the molding operation.

As the mold is opened by raising the punch, the holding pins are withdrawn from the openings in the metal top. The lifting force on the rear holding pin is sufficient to overcome the retention force of the push nut on the holding pin. The hole which is formed in the rear of the ski by the rear holding pin will be covered by the conventional fin cover. The fin cover is part of the fin which projects through a slot in rear of the ski. The hole for the front holding pin is in "tooling tab" at the front of the metal top. This tab extends beyond the front of the molded ski body and is removed.

After conventional finishing operations, such as trimming of flushing, the ski is ready for packing and shipping.

While in the foregoing specification a detailed description of a specific embodiment of the invention was set forth for the purpose of illustration, it will be understood that many of the details hereingiven may be varied considerably by those skilled in the art without departing from the spirit and scope of the invention.

I claim:

1. In a ski mold for molding composite skis having a metal top and a molded body, the ski mold including an open-cavity bottom mold part for molding the body of the ski and a top mold part, the top and bottom parts being supported for relative movement so that the parts can move together to close the cavity in the bottom part, the improvement comprising expansion compensation means on the top mold part for holding a metal top on the top mold part, the expansion compensation means including first means for holding the metal top at one end thereof and second means for holding the metal top at the other end thereof, the second holding means being movable in a direction parallel to a line extending between the two holding means whereby the metal top can expand relative to the top mold part as the metal top is heated.

2. The structure of claim 1 in which the second holding means includes a spring-biased pin which extends toward the bottom mold part, whereby the pin can extend through an opening in the metal top.

3. The structure of claim 2 in which the first holding means is a stationary pin on the top mold part which extends toward the bottom mold part, whereby the stationary pin can extend through an opening in the metal top.

4. The structure of claim 1 in which the top mold part is provided with a recess in the surface against which the metal top is held, the second holding means including a shuttle member slidably positioned in said recess, a spring resiliently biasing the shuttle away from the first holding means, and a pin mounted on the shuttle and extending out of the recess toward the bottom mold part, whereby the pin can extend through an opening in the metal top.

5. The structure of claim 4 including a cover plate attached to the top mold part for holding the shuttle in the recess, the cover plate having an elongated slot through which the pin extends.

6. The structure of claim 4 in which the first holding means is a stationary pin on the top mold part which extends toward the bottom mold part whereby the stationary pin can extend through an opening in the metal top.

7. A method of making a composite ski having a molded body and a metal top comprising the steps of:
positioning an uncured resin-impregnated body in the cavity of a two-part mold having an open-cavity bottom mold part and an upper mold part adapted to close the cavity;
movably supporting a metal top on the upper mold part so that the metal top can expand relative to the upper mold part as metal top is heated; heating the mold, said body and said top;
moving the mold parts together so that the upper mold part closes the cavity in the bottom mold part and compresses the body; and
allowing the metal top to become bonded to the body as the body cures.

8. The method of claim 7 in which the top mold part is heated after the metal top is supported thereon and before the mold parts are moved together whereby the metal top is heated and expands.

9. The method of claim 7 in which one end of the metal top is supported on the top mold part by a stationary holding means and the other end of the metal top is movably supported on the top mold part by a movable holding means.

10. The method of claim 7 including the step of forming an opening in the metal top adjacent each end thereof before the metal top is supported on the top mold part and thereafter movably supporting the metal top on the top mold part by inserting pins on the top mold part through the openings in the metal top, one of the pins being movably mounted on the top mold part.

* * * * *